Figure 1:
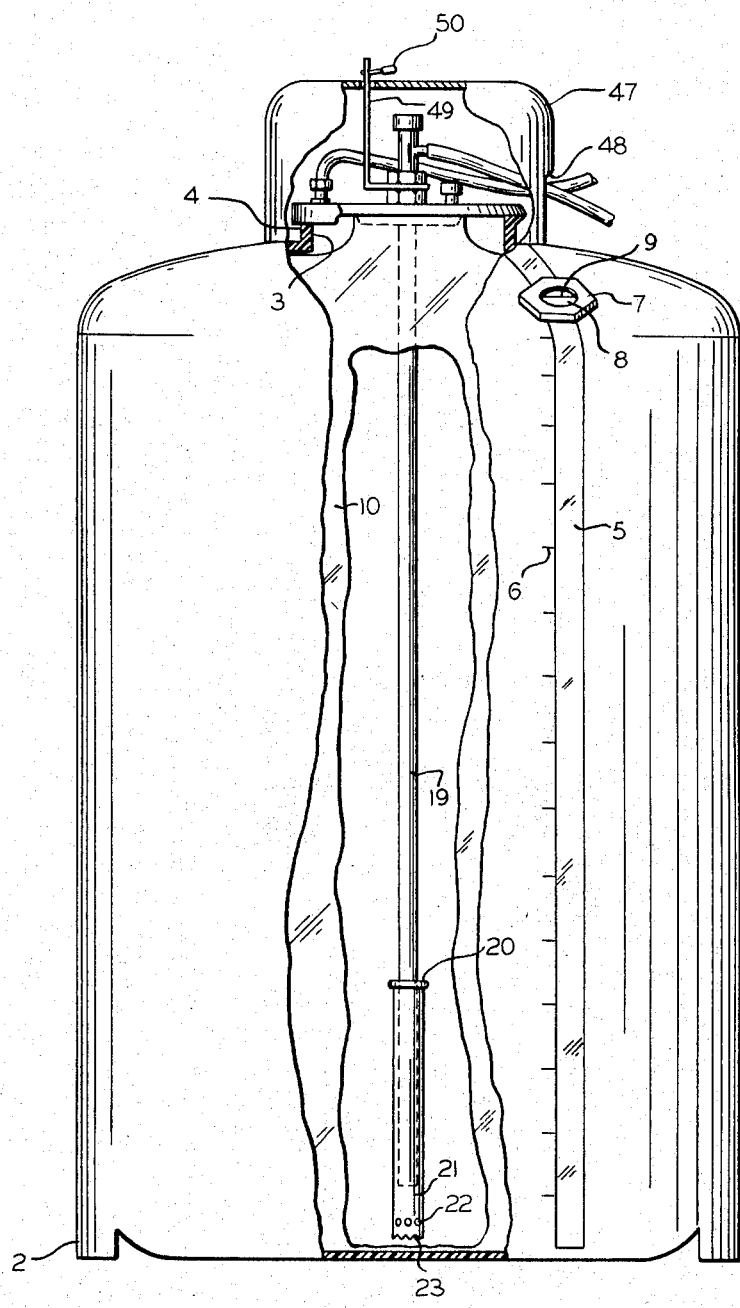

March 5, 1968     E. J. GALLOWAY     3,371,822
BULK DELIVERY, STORAGE AND DISPENSING APPARATUS
FOR LIQUID ICE CREAM MIXES AND THE LIKE
Filed July 1, 1966     3 Sheets-Sheet 1

INVENTOR
EDWIN J. GALLOWAY

BY *Allan W. Leiser*

ATTORNEYS

March 5, 1968   E. J. GALLOWAY   3,371,822
BULK DELIVERY, STORAGE AND DISPENSING APPARATUS
FOR LIQUID ICE CREAM MIXES AND THE LIKE
Filed July 1, 1966   3 Sheets-Sheet 3

INVENTOR
EDWIN J. GALLOWAY

BY *Allan W. Leiser*

ATTORNEYS

United States Patent Office 3,371,822
Patented Mar. 5, 1968

3,371,822
BULK DELIVERY, STORAGE AND DISPENSING APPARATUS FOR LIQUID ICE CREAM MIXES AND THE LIKE
Edwin J. Galloway, Menasha, Wis., assignor to Galloway Company, Neenah, Wis., a corporation of Wisconsin
Filed July 1, 1966, Ser. No. 562,329
8 Claims. (Cl. 222—95)

This invention relates to bulk delivery, storage and dispensing apparatus for liquid ice cream mixes and the like, and more particularly to apparatus designed to provide a high degree of santitation and efficiency in the bulk handling of such products.

Liquid mixes are widely used by ice cream stores and similar establishments. The mix is delivered to the store by a producer and is stored in a cold room on the premises until it is ultimately fed into an ice cream making machine.

Such mixes are highly perishable, easily contaminated and quite expensive, and delivery, storage and dispensing of the mixes to the machine present serious problems which are not solved by the systems currently in use. It is common, for example, to deliver the mix in conventional ten-gallon metal milk cans which are emptied into the ice cream machine as needed. Such cans are, however, heavy and difficult to handle, especially for the part time help often employed by the store. More importantly, the can covers do not provide an adequate seal, wherefore spoilage and contamination are likely during delivery and storage. Both the can and the machine must be opened to pour the mix into the machine, and this affords additional opportunity for contamination. Further, it is difficult to clean the cans properly after each use. Also, the cans are quite expensive and easily damaged, so that this system is not satisfactory from the producer's cost standpoint.

In an attempt to overcome the foregoing problems, some producers supply mix in disposable waxed paper cartons or similar small sealed containers. This procedure avoids some santitation problems, but contamination as the mix is dispensed into the machine is still possible. Further, it is difficult for the store owner to keep track of his inventory with a number of small containers, and a particular container may be forgotten and become spoiled. Still further, this method is even more costly per unit measure of mix.

As distinguished from the foregoing small lot systems now used, it is the general object of this invention to provide bulk delivery, storage and dispensing apparatus for ice cream mixes and like products.

It is one specific object of the invention to provide such apparatus which is highly santitary and which is relatively easy to maintain in a high state of santitation.

It is another object of the invention to provide apparatus which is substantially tamper-proof to virtually eliminate the possibility of intentional or accidental contamination by the user.

It is a further object of the invention to provide apparatus that is extremely efficient and accurate.

It is still another object of the invention to provide apparatus utilizing interchangeable storage and delivery tanks.

It is still another object of the invention to provide apparatus that is generally economical and simple to manufacture and use.

Other objects and advantages will appear from the description to follow. In the description, reference is made to the accompanying drawings, which form a part hereof, in which there is shown, by way of illustration and not of limitation, a preferred embodiment of the invention.

Figure 2:
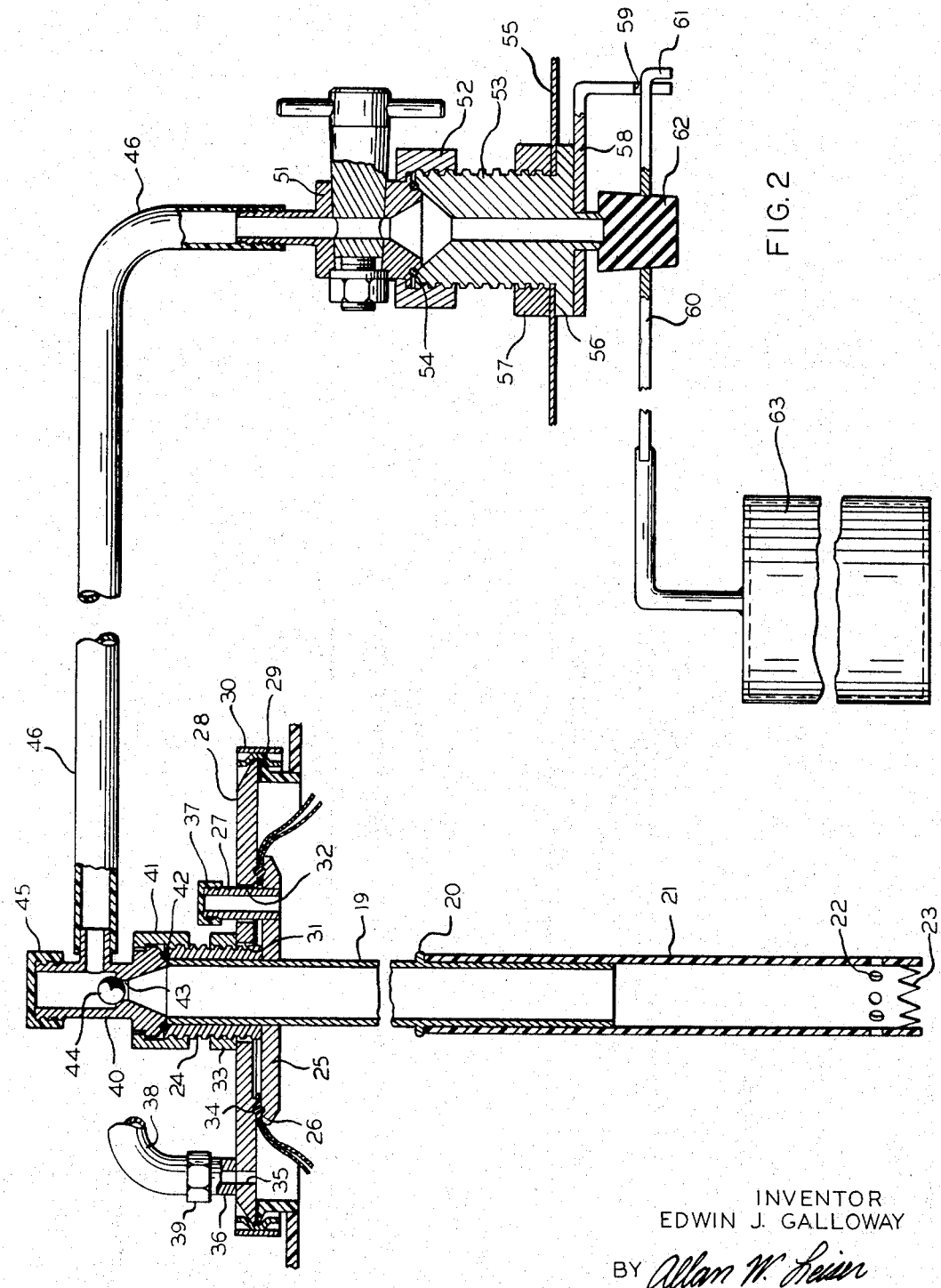
Figure 3:
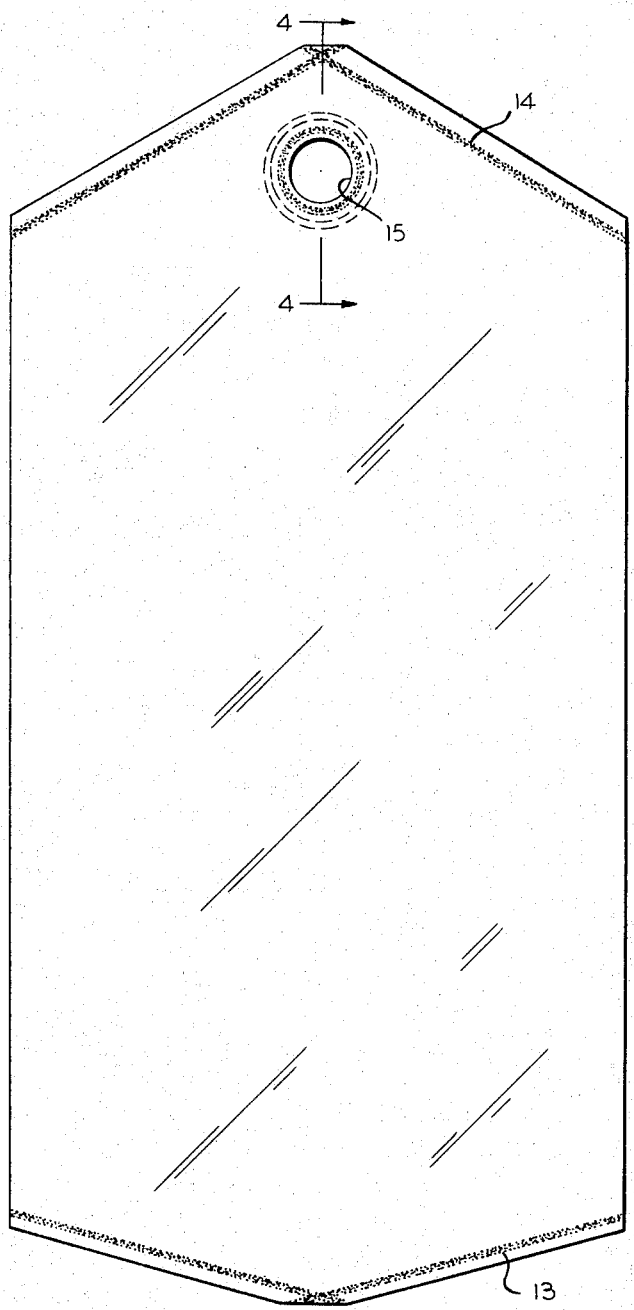
Figure 4:
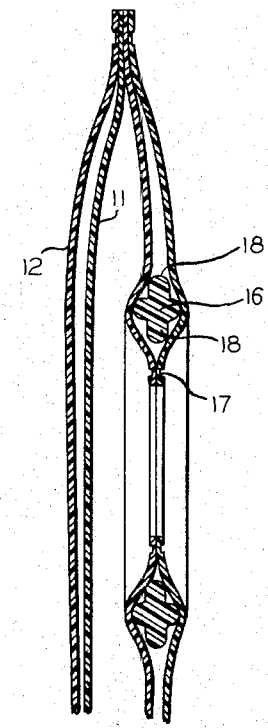

In the drawings:

FIG. 1 is a view in elevation, with parts shown broken away and in cross section, of a delivery and/or storage and dispensing tank formed according to the invention, FIG. 2 is an enlarged fragmentary view in cross section further illustrating the tank of FIG. 1 and dispensing apparatus used in connection therewith, FIG. 3 is a plan view of a disposable liner used in the tank of FIG. 1, and FIG. 4 is an enlarged fragmentary view in cross section through the plane 4—4 shown in FIG. 3.

The tank proper shown in FIGS. 1 and 2 is designated by the reference numeral 1 and is preferably formed of fiberglass, although any other suitable rigid material with suitable insulating characteristics could be substituted. It is preferably of generally cylindrical, one-piece construction, and is provided with integral supporting legs 2. There is an opening 3 at the top of the tank 1 which is surrounded by an upstanding flanged neck 4 which can be formed as a separate piece and glued in place in the opening 3. The tank 1 may be of any suitable size, and in the preferred embodiment shown has a capacity of slightly more than 145 gallons.

The fiberglass material of the tank 1 is pigmented in usual fashion, except along a narrow panel 5 running from the neck 4 down the side of the tank. The absence of pigment renders the panel 5 translucent so that by looking through it the operator is able to determine the amount of material left in the tank 1. Suitable volume markings 6 are placed alongside the panel 5 to enable the operator to read the volume of material remaining. Near the top of the panel 5 is a plug 7 provided with a transparent window 8 through which the operator can see into the tank 1. A horizontal "full" line 9 is drawn across the window 8 and when the material reaches this line the operator knows that the tank 1 has been filled to the desired capacity. The window 8 is located in the relatively horizontal top portion of the tank 1 so that the line 9 affords an accurate indication that capacity, 145 gallons in the embodiment shown, has been reached.

Supported in the tank 1 is a disposable liner bag 10, which can be seen most clearly in FIGS. 3 and 4. The liner 10 is formed of a suitable heat-sealable plastic film such as polyethylene, and is of two ply construction. It is formed from flattened tubular stock, an inner tube 11 being disposed within an outer tube 12. A bottom cross seal 13 and a top cross seal 14 define and close the lower and upper ends, respectively, of the liner 10 and also seal the inner tube 11 to the outer tube 12. As can be seen clearly from FIG. 3, the seals 13 and 14 are V-shaped so that both the top and bottom ends of the liner 10 taper to a point.

A circular fill opening 15 is cut through both tubes 11, 12 near the top of the liner 10, and a sealing ring 16 is interposed between the tubes about the opening 15. A circular seal 17 inside the ring 16 holds it in place and seals together the facing edges of the tubes 11, 12 about the opening 15. The ring 16 is formed of rubber or some other suitable resilient material, and has a flanged O-ring cross sectional configuration with opposite inner and outer beads 18 which are received in grooves as will be described.

A vertical dip tube 19, preferably formed of stainless steel, is disposed within the liner 10 and tank 1. Near its bottom end, the tube 19 is provided with an annular stop flange 20, and a tubular dip tube extension 21, formed of a very soft dairy grade plastic material, is tightly fitted on the tube 19 below the flange 20 and extends downwardly to the bottom of the tank 1. The bottom end of the extension 21 is provided with radial inlet ports 22, and is also notched at 23, the ports 22 and notches 23 allowing for the entry of material into the tube 19. The lower end of the extension 21 is or is likely to be against the liner 10, and its soft plastic construction insures against damage to the liner in the event of any rubbing contact.

The top end 24 of the dip tube 19 is provided with sanitary threads. Immediately below the threaded portion 24 is a circular mounting plate 25 which is formed integrally with the dip tube 19. The plate 25 has a flat upper surface in which is formed a circular groove 26 which matches and receives the inner bead 18 of the sealing ring 16. A threaded vent tube 27, formed with or affixed to the plate 25, extends above and opens downwardly through the plate 25 at a point radially inward from the groove 26.

The dip tube 19 is supported on a circular stainless steel cover 28 which is coextensive with and rests atop the neck 4, a suitable gasket 29 being interposed therebetween. A split-ring coupling 30, of any suitable conventional construction known to those skilled in the art, holds the cover securely against the neck 4. The cover 28 is provided with a dip tube opening 31 and a vent tube opening 32 which loosely receive the dip tube threaded portion 24 and vent tube 27, respectively, and a nut 33 on the portion 24 above the cover 28 holds the tube 19 in place.

The bottom surface of the cover 28 is flat and is provided with a circular groove 34 which is in alignment with the groove 26 and receives the outer bead 18 of the ring 16, the liner 10 thus being clamped between and supported by the cover 28 and plate 25. The bottom surface of the cover 28 inside the groove 34 is preferably recessed slightly to insure that the ring 16 is securely clamped in place.

Radially outwardly of the groove 34, and thus outwardly of the liner 10, the cover 28 is provided with an air inlet 35 and a conventional air hose fitting 36.

As indicated previously, the tank 1 can be used as either a delivery tank or as a storage and dispensing tank. As shown in the drawing, it is fitted as a storage and dispensing tank, and the appurtenant elements hereinafter described have reference to these functions.

When thus fitted, the vent tube 27 is closed off by means of a disposable threaded cap 37 formed of nylon or some other suitable material. A compressed air hose 38, leading from a suitable compressor (not shown), is connected to the fitting 36 by a suitable conventional coupling 39.

A T-shaped outlet check valve 40 is connected to the dip tube portion 24 by means of a captive nut 41, a suitable sealing gasket 42 being interposed therebetween. The vertical leg of the valve 40 serves as an inlet and access bore, and is provided with an upwardly facing valve seat 43 below its midpoint. A disposable ball valve 44, preferably formed of nylon, is disposed above the seat 43. A disposable threaded cap 45, preferably nylon, closes off the top of said vertical leg and is removable to allow the ball 44 to be removed. The horizontal leg of the valve 40 provides an outlet bore, smaller than the ball 44, which is connected to a transfer line 46, preferably of plastic tubing.

A stainless steel guard 47 in the shape of an inverted bowl rests atop the tank 1 and covers and encloses the various fittings, the guard 47 being provided with an opening 48 through which the lines 38, 46 pass. An L-shaped bracket 49 has a horizontal leg which encircles the dip tube threaded portion 24 and is held captive between the nuts 33, 41, and a vertical leg which extends through a small opening in the top of the guard 47. A conventional lead and wire seal 50 is attached to the exposed end of the bracket 49 to lock the guard 47 in place.

The transfer line 46 leads and is connected to a conventional plug valve 51. A nut 52 held captive on the valve 51 connects the latter to a threaded stainless fitting 53, a gasket 54 being interposed therebetween. The fitting 53 extends through an opening in the hopper cover plate 55 of a conventional ice cream making machine (not shown since the construction of such machines is well known to those skilled in the art and since the apparatus of this invention may be used with a wide variety of such machines) and is connected thereto by means of an integral flange 56 and a nut 57.

A generally L-shaped bracket 58 is securely attached to the fitting 53 below the cover 55 and has a downwardly depending leg provided with opposite front and rear notches 59, only one of which can be seen in FIG. 2, it being understood that the bracket 58 has substantial front to rear thickness as seen in FIG. 2 and that there is another notch 59 directly behind the one seen. A float arm 60 has a bifurcated right hand portion as seen in FIG. 2 comprising two hooked attachment arms 61, only one of which is seen in FIG. 2, which are received in respective notches 59 to pivotally mount the arm 60 on the bracket 58 and fitting 53. To the left of the arms 61, the arm 60, which also has substantial front to rear thickness as seen in FIG. 2, is provided with an opening which tightly receives a rubber or plastic stopper 62 which is in alignment with the fitting 53 and is movable with the arm 60 to open or close the same. At its far left end, the arm 60 mounts a float 63 adapted to sense the level of material in the hopper.

When fitted and in use as a storage and dispensing tank as shown in FIGS. 1 and 2, the tank 1 and liner 10 are wholly or partially filled with liquid ice cream mix (not shown). When compressed air is then introduced into the tank 1 through the line 38 and opening 35, force will be exerted on the outside of the liner 10 which will cause it to collapse, driving the mix into the bottom end of the dip tube extension 21, through the tube 19 and valve 40 and into the transfer line 46. The mix will then be forced through the valve 51, assuming it is open, and into the fitting 53. If the float 63 is raised as the result of there already being sufficient mix in the hopper, further flow will be blocked by the stopper 62. As soon as the float 63 lowers upon depletion of the supply of mix, however, the stopper 62 will be moved downwardly away from the fitting 53 to allow more mix to flow into the hopper. During normal operation, the valve 51 is always kept open and there is a constant supply of compressed air to keep the tank pressurized to about 15 lbs. per square inch above atmospheric pressure. As a result, the lines will always be full, and the supply of mix in the hopper will be constantly maintained at a desired level. The entire system is enclosed, so that there is no possibility of contamination of the mix. At all times, the ball 44 prevents mix from flowing back into the liner 10.

At the end of the day or whenever it is desired to shut down, the store operator need only close the valve 51 to shut off the supply of mix and shut off the compressed air supply. The system remains sealed from this point back to prevent contamination. To clean the system for overnight shutdown, the operator needs only to loosen the nut 52 to disconnect the valve 51 from the fitting 53, clean the exposed end of the valve 51 and the fitting 53 and its associated elements, a relatively quick and simple process.

It is important to note that the operator cannot return any mix to the liner 10 because of the check valve 44 and the sealed guard 47. Any spoilage or contamination resulting from an attempt to save unused mix in the hopper will, therefore, clearly be attributable to the operator rather than the producer. It is also important to note that the operator is at all times able to determine how much mix is left in the tank 1 by visual observation through the panel 5 and window 8.

When the tank 1 is emptied, it is refilled by the producer as follows. The seal 50 is broken and the guard 47 is removed, the air line 38 is removed, and the valve 51 is disconnected from the fitting 53. The coupling 30 is then disconnected, and the cover 28, dip tube 19 and liner 10 are removed. The cap 37 and liner 10 are thrown away; and the tube 19, extension 21, cover 28, nut 33, line 46 and valve 51 are returned to the producer's plant for sanitizing. The valve 40 is also returned and sanitized, but to make this substantially easier the cap 45 and ball 44 are removed and thrown away.

The producer provides two fresh, sanitized assemblies for each filling. The first comprises a freshly sanitized tube 19, extension 21, cover 28 and nut 33 and a virgin liner 10 and cap 37, these elements having been assembled at the plant on a "dry hand" basis under highly controlled sanitary conditions. For transportation to the store, at least the exposed tube end 24 of this assembly should be covered with a single service plastic pouch. These elements are assembled quite easily, the tube 19 and extension 21 being inserted into the opening 15 and the ring 16 being stretched over the plate 25 and the cover 28 and nut 33 then being attached, with the beads 18 disposed in the grooves 26 and 34.

For filling at the store, the cover 28 may be rested on the neck 4 with the liner 10 in the tank 1, but it is preferable to support it by suitable means (not shown) above the tank 1 with the liner 10 only partially inserted. In either event, a supply line (not shown) is suitably attached to the tube portion 24 and mix is forced into the liner 10, the vent tube 27 being opened to allow trapped air to escape. If the liner 10 has been only partially inserted in the tank 1 during filling, it is fully inserted just prior to the completion of the filling operation. Filling is continued until the mix reaches the line 9. As indicated, this line affords an accurate measure of capacity which is important to both the producer and store operator in view of the relatively high cost of the mix. After filling is completed, the cap 37 is replaced and the coupling 30 attached.

The second assembly supplied by the producer comprises a fresh, sanitized valve 40, with a virgin cap 45 and ball 44, line 46 and valve 51. Again, these are assembled at the plant, "dry hand" under highly controlled conditions. For transportaton, at least the exposed ends of the valves 40 and 51 are covered by a single service pouch or pouches. After filling, the valve 40 is connected to the tube end 24 and the valve 51 is connected to the fitting 53. The bracket 49 is replaced on the tube end 24 before the valve 40 is connected, and after connection the cover 47 is replaced and a new seal 50 attached.

A tank substantially identical to the tank 1 is used for delivery purposes, a number of such tanks being carried by a delivery vehicle. These are filled at the plant in essentially the same manner as filling is accomplished at the store, the tube portion 24, however, simply being capped after filling. For transfer to a tank at the store, an air line from a compressor on the vehicle is attached to the fitting 36, and a supply line is attached to the tube portion 24. The liner 10 of the delivery tank is also thrown away after each use, and other elements appropriately sanitized.

The liner 10 comprises an important feature of the invention, both from the standpoint of its function and from the standpoint of its construction. In the former connection, it will be obvious that the liner 10 forms a convenient, sanitary inner enclosure for the mix which makes it unnecessary to sterilize the inside of the tank 1. Further, the liner 10 allows for delivery or transfer of mix by means of compressed air from outside to minimize the possibility of contamination.

The two ply construction of the liner 10 has proven relatively important in preventing the development of leaks which might allow mix to escape from the liner 10 or the entry of foreign matter. Apparently, any abrasion or mishandling affects only the outer tube 12, and the inner tube 11 is protected thereby. The same benefits might be obtained by using a single ply liner, but this would necessitate using a much thicker film and result in a more expensive liner. With the two ply construction, film thicknesses of only 2 or 3 mils are necessary.

The two ply construction is also important in that it allows for the simple mounting of the ring 16 by means of a single seal, the ring 16 being completely enclosed and securely held in place. The ring 16 is itself important in providing a secure seal and support for the liner 10.

The shape of the liner 10 is also important. The tapered bottom end allows for more accurate, complete filling by eliminating square corners which might fold over and develop pockets during filling. The tapered top eliminates waste material above the opening 15 without necessitating the provision of a formed neck which would be considerably more expensive.

Manufacturing the liner 10 from tubular stock allows for the various advantages discussed above utilizing only two simple end seals. There are no difficult side seals.

In addition to being highly sanitary and easy to handle, the apparatus shown has proven highly efficient, and only a very small percentage of the mix is wasted by being left in the liner 10 after emptying. Again, this is very important, to the producer as well as the operator, in view of the cost of the mix.

Although a preferred embodiment of the invention has been shown and described herein, it will be obvious that modifications, of both structure and use, might be made without departure from the spirit of the invention. For example, although the invention has been shown and described with particular reference to the handling of ice cream mixes, it will be obvious that the structure shown is adaptable to other uses. The invention is not intended to be limited by the showing herein, or in any other manner, except insofar as limitations specifically appear in the following claims.

I claim:

1. Apparatus of the class described comprising: a rigid tank with an opening near its top; a dip tube passing through the opening and having a lower end in the tank, an upper end portion extending above the tank, and an outwardly extending plate near the top of the tank; a cover that closes off the tank opening, said cover lying atop said plate and having an opening through which said upper dip tube portion passes; holding means on said upper dip tube portion and engageable with the cover to support the dip tube on the cover and hold the plate against the cover; a liner in the form of a bag disposed in the tank, said liner being provided with a fill opening surrounding the dip tube above the plate; resilient seal means extending about the fill opening and clamped between the cover and plate to support the bag and seal off the fill opening; an air fitting leading downwardly through the cover at a point within the area of the tank opening but spaced outwardly from the area circumscribed by the seal means; closable vent means opening through the plate and cover within the area circumscribed by the seal means; and a releasable coupling connecting the cover to the tank.

2. Apparatus according to claim 1 wherein there is an outlet check valve connected to the upper end of the dip tube that is adapted to allow material to flow outwardly through the dip tube but to prevent material from flowing inwardly through the tube.

3. Apparatus according to claim 2 wherein the check valve is substantially T-shaped with a straight inlet and access bore one end of which communicates with the dip tube and the other end of which is open and with a smaller outlet bore leading from the inlet and access bore, the inlet and access bore being provided with a valve seat between its connection with the dip tube and the point where the outlet bore leads therefrom and a ball valve member engageable with the seat that is disposed and freely movable in the portion of the inlet and access bore that is beyond the seat with respect to the dip tube, said said ball being larger than the outlet bore, the open end of the inlet and access bore being provided with a cap which is removable to allow the ball to be removed from the valve.

4. Apparatus according to claim 2 wherein there is a transfer line leading from the outlet valve, a closable valve that is connected to the terminus of the transfer line, a through fitting that communicates with and is releasably connected to said closable valve and that is adapted to be mounted on and extend through a wall of a hopper of an ice cream making machine or the like, a float arm pivotally connected to the fitting and having a float member, and a stopper carried by the float arm that is movable therewith to open and close the fitting.

5. Apparatus according to claim 2 wherein the upper end portion of the dip tube is threaded and the holding means comprises a nut thereon; and there is a bracket that encircles the threaded portion of the dip tube and is held captive thereon between said nut and the outlet valve and that extends outwardly; and there is an inverted bowl like guard lying atop the tank that covers and encloses the cover, coupling, air fitting, vent means and outlet valve, said guard being provided with a first opening therethrough and a second opening through which the bracket extends; and there is breakable seal attached to the outer end of the bracket which prevents removal of the guard.

6. Apparatus according to claim 1 wherein the liner is in the form of a two-ply bag having upper and lower ends which taper to a point; and wherein the seal means includes a resilient ring is disposed and held between the two plies near the upper end of the bag.

7. A liner bag for apparatus of the class described, said bag being formed of a heat-sealable plastic film in the form of a tube and being provided at both ends with V-shaped cross seals to define upper and lower ends which taper to a point, there being a fill opening through the bag near the apex of the upper end thereof and a resilient seal ring which surrounds the fill opening.

8. A liner bag according to claim 7 wherein the bag is formed of an inner and an outer tube to have a two ply construction, the cross seals also connecting the inner and outer tubes together; and wherein the seal ring is loosely disposed between the two plies around the fill opening, and the plies are sealed together radially inwardly of the ring to hold the ring in place about the fill opening.

References Cited

UNITED STATES PATENTS

| | | | |
|---|---|---|---|
| 3,058,624 | 10/1962 | Westlake | 222—107 |
| 3,083,875 | 4/1963 | Welty et al. | 222—95 |

FOREIGN PATENTS

| | | |
|---|---|---|
| 452,582 | 11/1948 | Canada. |

ROBERT B. REEVES, *Primary Examiner.*

H. S. LANE, *Assistant Examiner.*